(12) United States Patent
Johri et al.

(10) Patent No.: US 9,026,296 B1
(45) Date of Patent: May 5, 2015

(54) SYSTEM FOR CONTROLLING OVERALL COASTING TORQUE IN A HYBRID ELECTRIC VEHICLE

(71) Applicant: Ford Global Technologies, LLC, Dearborn, MI (US)

(72) Inventors: Rajit Johri, Ann Arbor, MI (US); Mark Steven Yamazaki, Canton, MI (US); Xiaoyong Wang, Novi, MI (US); Wei Liang, Farmington Hills, MI (US); Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 14/074,748

(22) Filed: Nov. 8, 2013

(51) Int. Cl.
*B60W 10/00* (2006.01)
*B60W 20/00* (2006.01)
*B60W 10/08* (2006.01)
*B60L 11/00* (2006.01)
*B60W 10/06* (2006.01)

(52) U.S. Cl.
CPC .............. *B60W 20/10* (2013.01); *B60W 10/06* (2013.01); *B60W 10/08* (2013.01); *Y10S 903/902* (2013.01)

(58) Field of Classification Search
USPC .................. 701/22; 180/65.1, 65.21, 65.265, 180/65.275; 477/7–9, 12–15
See application file for complete search history.

(56) References Cited

U.S. PATENT DOCUMENTS

| | | | |
|---|---|---|---|
| 5,343,970 A * | 9/1994 | Severinsky | 180/65.25 |
| 5,915,801 A | 6/1999 | Taga | |
| 5,923,093 A | 7/1999 | Tabata | |
| 6,378,636 B1 * | 4/2002 | Worrel | 180/65.25 |
| 7,841,433 B2 | 11/2010 | Soliman | |
| 2003/0184152 A1 | 10/2003 | Cikanek | |
| 2011/0108340 A1 * | 5/2011 | Cherouvrier | 180/65.265 |
| 2013/0204479 A1 * | 8/2013 | Takamura et al. | 701/22 |
| 2014/0290592 A1 * | 10/2014 | Vignon et al. | 123/2 |

* cited by examiner

*Primary Examiner* — Yonel Beaulieu
(74) *Attorney, Agent, or Firm* — David B. Kelley; Brooks Kushman P.C.

(57) ABSTRACT

A hybrid vehicle is provided that includes an engine, a reversible electric machine capable of generating and providing electric power, and a clutch for selectively engaging the engine to the electric machine. While the vehicle is traveling, an operator of the vehicle may release ("tip-out") the accelerator pedal, indicating a desire for a reduction in speed and/or acceleration of the vehicle. If the clutch is engaged during the tip-out, the at least one controller is programmed to disengage the clutch and alter a commanded torque to the electric machine in response to the tip-out of the accelerator pedal to simulate compression braking of the engine. If the vehicle is operating in an electric-only mode of propulsion during the tip-out, and if a state-of-charge of the battery is relatively high, the controller is programmed to activate the engine and provide compression torque to the driveline in response to the tip-out.

21 Claims, 3 Drawing Sheets

SYSTEM FOR CONTROLLING OVERALL COASTING TORQUE IN A HYBRID ELECTRIC VEHICLE

TECHNICAL FIELD

The present disclosure relates to a system in a hybrid electric vehicle for controlling the overall negative torque in the vehicle while the vehicle is coasting after a tip-out of an accelerator pedal.

BACKGROUND

In vehicles that include an internal combustion engine, compression braking occurs when the vehicle is coasting. Compression braking is a negative torque supplied by the engine that slows the vehicle down when the accelerator pedal is released. Compression braking can be caused by, for example, a closed-throttle partial-vacuum when there is zero acceleration request.

Hybrid electric vehicles (HEVs) include an internal combustion engine and an electric machine (such as a motor/generator) that provide power to propel the vehicle. If the engine "on" and available to immediate propulsion power, compression braking can be provided by the engine during vehicle coasting. Due to the presence of the electric machine in the powertrain, inconsistencies of compression braking may be felt by an operator of the vehicle during vehicle coasting.

SUMMARY

According to one embodiment, a hybrid vehicle includes an engine, an electric machine, and a disconnect clutch for selectively coupling the engine to the electric machine. An accelerator pedal is provided. At least one controller is programmed to disengage the disconnect clutch and alter a commanded torque to the electric machine in response to a tip-out of the accelerator pedal in order to simulate compression braking of the engine. The at least one controller is further programmed to command braking torque in the electric machine in response to the tip-out of the accelerator pedal. A magnitude of the braking torque commanded by the at least one controller varies in response to various tip-outs of the accelerator pedal occurring at correspondingly various vehicle speeds such that the braking torque of the electric machine simulates various magnitudes of engine compression braking at various vehicle speeds. The magnitude of the braking torque commanded by the at least one controller is determined from a look-up table as a function of vehicle speed. A battery is also provided. The battery is electrically connected to the electric machine for storing electric power generated by the electric machine. The at least one controller is further programmed to re-engage the clutch and activate the engine in response to (i) the accelerator pedal being non-depressed and (ii) a state of charge (SOC) of the battery exceeding a SOC threshold. The at least one controller is further programmed to alter the commanded torque to the electric machine during vehicle coasting based upon (i) vehicle speed and (ii) engine torque.

According to another embodiment, a system is provided for controlling coasting torque in a hybrid vehicle. The system comprises an engine, an electric machine selectively coupled to the engine via a clutch, a battery electrically connected to the electric machine, and an accelerator pedal. At least one controller is programmed to engage the clutch during an electric-only mode of operation in response to (i) a tip-out of the accelerator pedal and (ii) a state-of-charge of the battery exceeding a charge threshold. The at least one controller is further programmed to alter a rate of decrease of braking torque of the electric machine while a braking torque of the engine is maintained in response to a reduction of vehicle speed. The at least one controller is further programmed to alter the rate of decrease of the braking torque in the electric machine during vehicle coasting based upon an increase of engine torque.

In another embodiment, a system for controlling coasting torque in a hybrid vehicle is provided. The system includes an engine, an electric machine having an output, and a clutch selectively coupling the engine to the electric machine. At least one controller is programmed to engage the clutch during an electric-only mode of operation in response to (i) a tip-out of an accelerator pedal and (ii) a rotational speed of the output of the electric machine being above a speed threshold. A brake pedal is also provided. A coasting event is defined during a time in which the accelerator pedal and the brake pedal are non-depressed. A battery is electrically connected to the electric machine for storing electric power generated therefrom. The at least one controller is further programmed to engage the clutch during the coasting event in response to a state of charge of the battery being above a state-of-charge threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
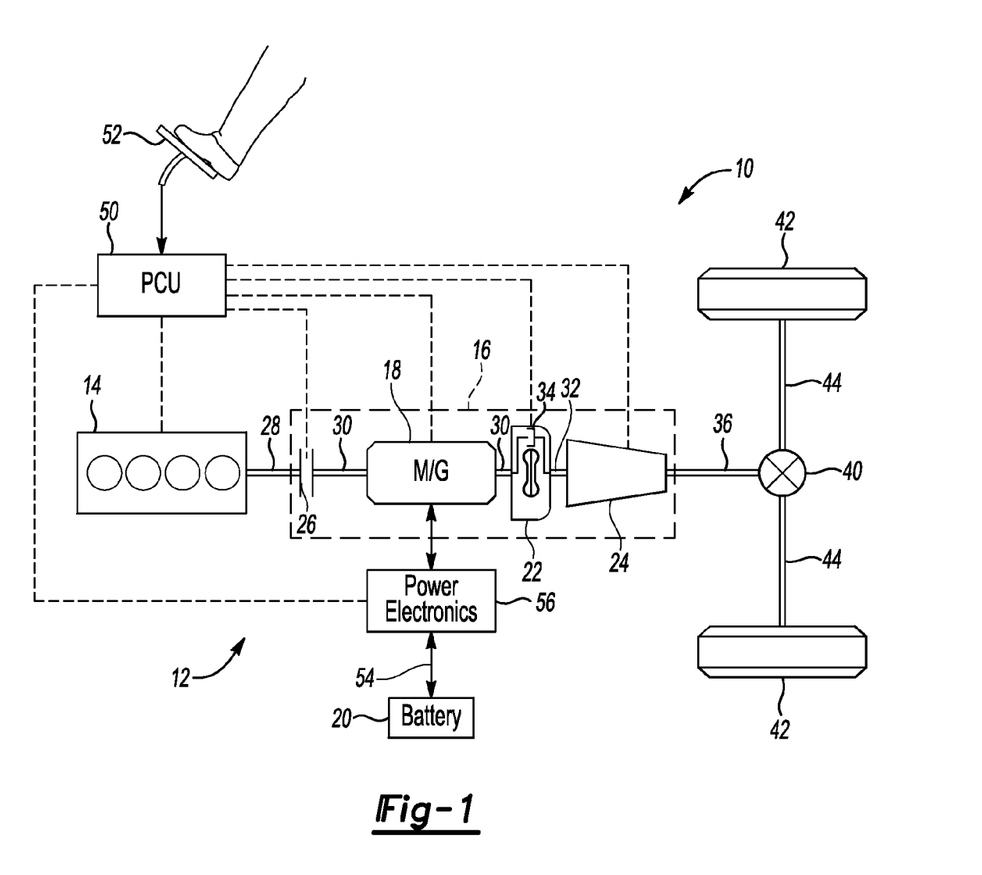
FIG. 1 is a schematic illustration of a powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics 56 may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal 52, the controller 50 commands torque from the engine 14 and/or the M/G 18.

When the driver releases the accelerator pedal 52, demand for acceleration falls to zero and the controller 50 does not command additional acceleration. This action can be referred to as a tip-out of the accelerator pedal 52. Subsequent to an accelerator pedal tip-out, the vehicle begins coasting. If the engine 14 is connected to the M/G 18 via the disconnect clutch 26 during the coasting, the powertrain 12 experiences a negative torque due to the engine friction and compression work in the engine 14 without much (if any) fuel input into the engine 14. This negative torque can be referred to as engine compression torque, or engine braking torque. The vehicle begins to slow due to the engine braking until a creep speed is reached, or until the driver demands additional acceleration via the accelerator pedal 52.

Along with the controlling of the accelerator demands, the controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

As previously described, a vehicle (such as the vehicle illustrated in FIG. 1) may experience engine braking torque due to compression in the engine when acceleration demands are zero and the engine is on. In the HEV 10, engine braking due to compression in the engine 14 is realized in the powertrain 12 only when the disconnect clutch 26 is at least partially engaged to at least partially connect the engine 14 to the M/G 18. The amount of engine compression braking torque experienced in the powertrain 12 is dependent upon certain operating conditions, such as engine speed. However, for a given engine speed, the amount of engine compression braking torque can vary based on several other factors, such as altitude, engine aging, and engine temperature, and the like that impact the amount of resistance subjected on the pistons of the engine during a piston stroke throughout the engine compression braking event.

Additionally, in an MHT vehicle, the amount of compression braking torque in the engine 14 can vary depending on the operating state of the powertrain. For example, in an electric-only operating mode, there is no compression braking torque from the engine 14 because it is isolated from the remainder of the powertrain 12. In a hybrid operating mode, or during times in which the disconnect clutch 26 is at least partially engaged (such as starting/stopping of the engine 14), compression braking torque from the engine 14 may sometimes only be partially transferred throughout the powertrain 12. These changes in engine compression torque can lead to inconsistent magnitudes of compression braking across various driving ranges of the vehicle, as well as unpredictable behavior of the vehicle. For example, when the vehicle is operating in the hybrid operating mode, the vehicle may experience relatively high negative torque in response to a tip-out of the accelerator pedal due to engine compression; however, when the vehicle is operating in the electric-only mode, the vehicle may experience no negative torque from the engine.

According to the present disclosure, a system is provided that delivers an overall consistent negative torque (or "overall coasting torque") during a coasting event throughout the powertrain. In other words, the system provides a consistent overall coasting torque subsequent to a tip-out of the accelerator pedal, regardless of the state of the engine. To provide a consistent overall coasting torque, the controller 50 controls the M/G 18 to supplement (or substitute for) the engine compression torque. For example, even when the vehicle is operating in the electric-only mode, the operator of the vehicle can experience a negative torque in the powertrain of the vehicle when the vehicle is coasting similar to the engine compression torque that would otherwise be experienced if the engine were enabled during a hybrid operating mode.

Figure 2:
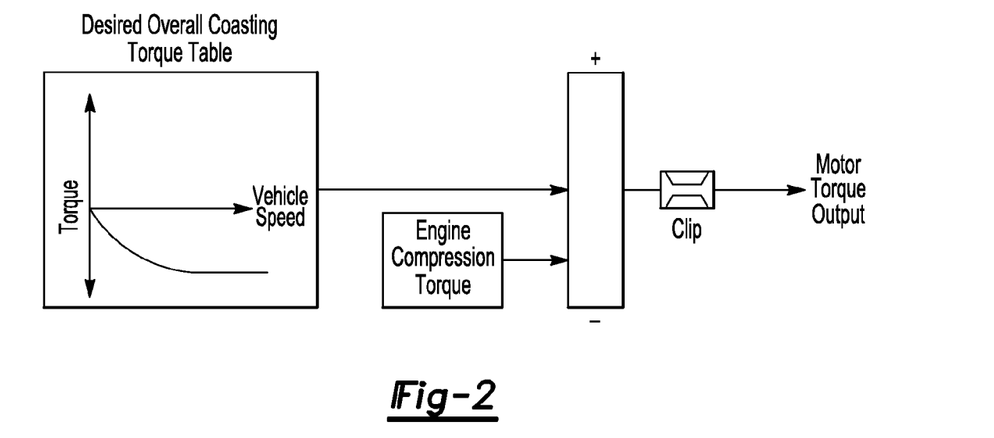
FIG. 2 is a schematic illustration of a control strategy for controlling an overall coasting torque in the vehicle.

FIG. 2 is a schematic illustration of the overall coasting torque control strategy according to one embodiment of the present disclosure. This strategy can be implemented by a controller, such as the PCU 50, for example.

A desired overall coasting torque table is stored in a computer readable storage device that is in communication with the controller. The desired overall coasting torque increases negatively as the vehicle speed increases. For example, if a tip-out event occurs while the vehicle is traveling at 60 mph, the amount of negative torque desired to be realized throughout the powertrain 12 is greater than if the tip-out event occurs while the vehicle is traveling at 30 mph. The desired overall coasting braking table may be stored in the form of a lookup table. It should be understood that any amounts of desired overall coasting torque values can be stored in the lookup table, and the one shown in FIG. 2 is merely exemplary. For example, the amount of desired overall coasting torque can be linear and/or constant. In response to the tip-out event, the processor will determine the vehicle speed and look up the desired overall coasting torque.

In response to the tip-out event, the controller also determines the amount of engine compression torque. This can be determined, for example, by a torque sensor or other similar conventional means. The amount of engine compression torque typically increases with higher vehicle speeds. As previously described, the amount of engine compression torque may be zero if the engine 14 is disconnected from the M/G 18.

The controller then compares the amount of engine compression torque with the desired overall coasting torque from the lookup table. The difference between the two is clipped (to prevent extremely-high and extremely-low readings), and the result is a commanded motor torque output. The commanded motor torque output is sent to the M/G 18 for regenerative braking, or electric braking. The desired overall coasting braking is therefore fulfilled by the combination of the negative torque output by the engine 14 (engine compression torque) and the negative torque output by the M/G 18 (electric braking).

Figure 3:
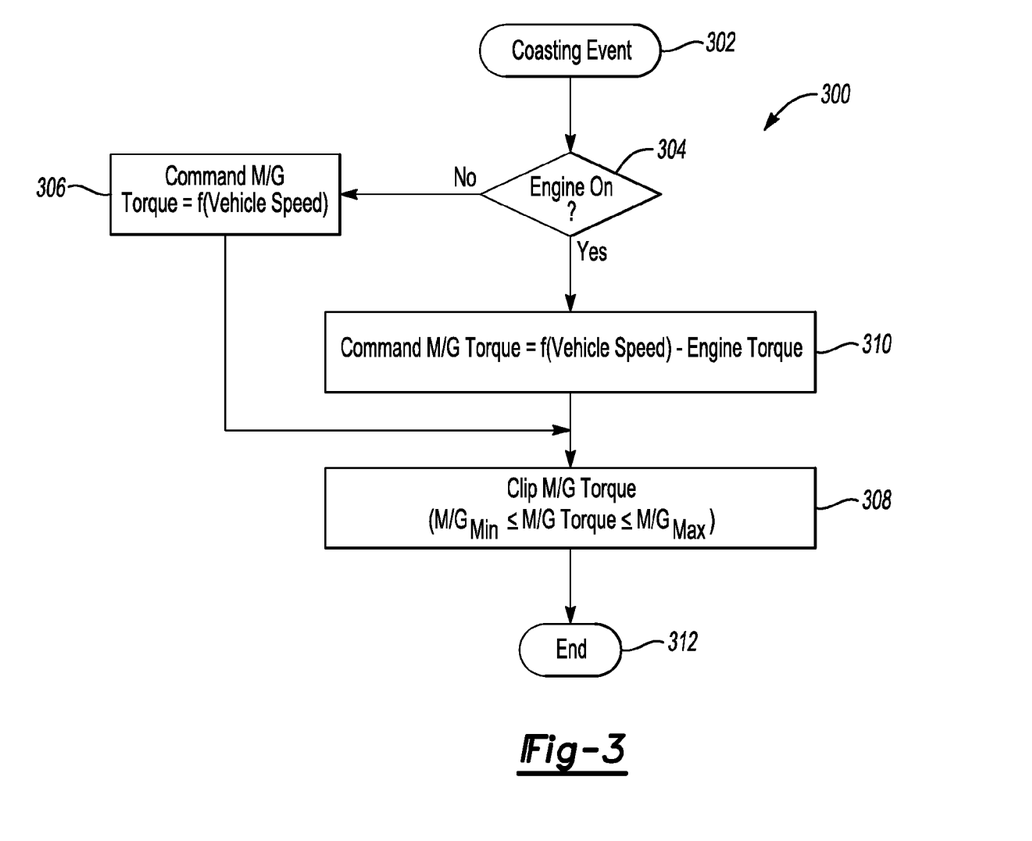
FIG. 3 is a flow chart of an algorithm for controlling the overall coasting torque during a coasting event.

FIG. 3 illustrates a flowchart 300 of an example of an overall algorithm 300 implemented by the controller 50 to command and control the overall coasting torque. At 302, the controller determines the beginning of a coasting event. This is indicated by the release or tip-out of the accelerator pedal 52 as previously described. Once the coasting event begins, the system controls the negative torque (regenerative braking) of the M/G 18 to provide a consistent overall coasting torque that simulates consistent engine compression braking, as will be described below. The coasting event, and thus the control strategy, continues until a subsequent depression of the accelerator pedal, brake pedal, or leveling off of the vehicle speed.

At 304, the controller determines whether the engine 14 is on and/or coupled to the M/G 18 via the disconnect clutch 26. If the engine 14 is off, then at 306 the commanded negative torque output to the M/G 18 is a function of vehicle speed. Once the commanded negative torque output is determined, it is clipped at 308 such that the final negative torque output command sent to the M/G 18 is within a minimum and maximum threshold. This prevents any over- or under-delivery of regenerative braking by the M/G 18 that may harm, for example, the power electronics 56 or the battery 20.

If the controller determines that the engine 14 is on and the disconnect clutch 26 is engaged to couple the engine 14 to the M/G 18, this indicates that the engine 14 is providing compression braking to the powertrain. Therefore, at 310, the commanded negative torque output to the M/G 18 is determined as a function of vehicle speed, less the amount of engine compression torque. The amount of regenerative braking commanded by the controller to the M/G 18 is therefore dependent upon the amount of engine compression torque sustained in the engine 14. The commanded negative torque output is clipped at 308 to again prevent any over- or under-delivery of regenerative braking. The control system ends at 312 and returns to maintain the overall coasting torque at a desired amount based upon the changes in vehicle speed, as indicated by the lookup table.

Figure 4:
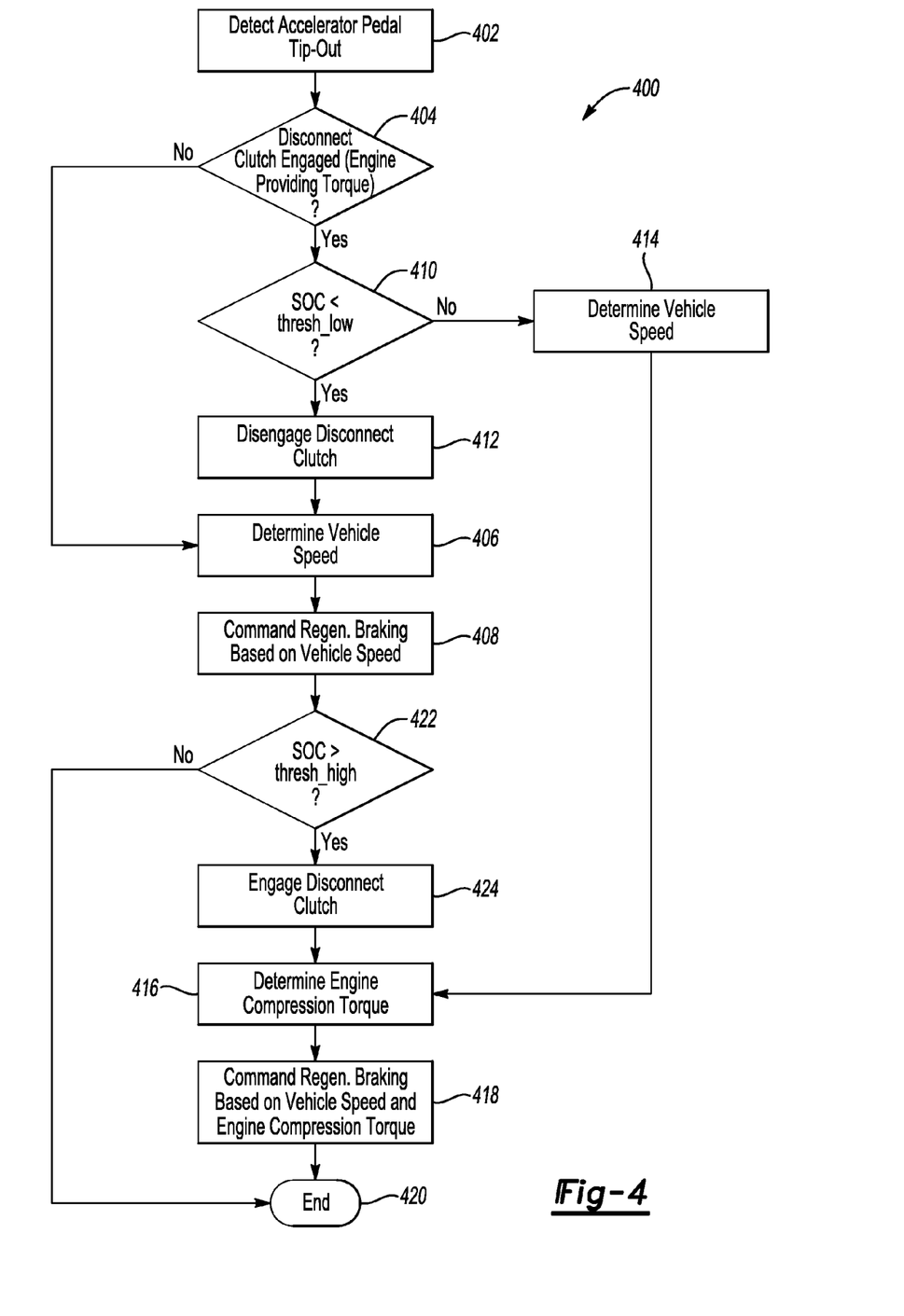
FIG. 4 is a flow chart of another algorithm for controlling the overall coasting torque during a coasting event.

FIG. 4 is a flowchart illustrating another exemplary algorithm 400 implemented by the controller 50 to command and control the overall coasting torque. The algorithm 400 illustrated in FIG. 4 is a more detailed algorithm that that of FIG. 3, and controls the overall coasting torque based on several factors, including whether the engine 14 is actively providing compression braking, the state of the disconnect clutch 26, and the state of charge (SOC) of the battery 20.

At 402, the controller detects a tip-out of the accelerator pedal 52. This indicates the start of a coasting event. At 404, the controller determines whether the disconnect clutch 26 is engaged, coupling the engine 14 to the M/G 18. This indicates that during a coasting event, the engine 14 is providing some amount of engine compression torque. If a determination of NO is made at 404, then the algorithm proceeds to 406, at which the controller determines the speed of the vehicle. The controller commands regenerative braking in the M/G 18 to provide negative torque at an amount based upon the vehicle speed by utilizing the lookup table, for example.

By implementing the system of FIG. 4 as so-far described, the M/G 18 is the sole source for negative torque in the powertrain 12. When the engine 14 is not providing any compression braking, the M/G 18 simulates compression braking by providing regenerative braking at a magnitude that is desirable to effectively simulate compression braking that occurs in a non-hybrid vehicle, for example.

If, however, the engine 14 is providing compression braking as determined at 404, then the algorithm proceeds to 410. At 410, the controller determines the SOC of the battery 20 and compares it to a first SOC threshold (thresh_low). If the SOC is below this threshold, the SOC of the battery 20 may be low and it is desirable to recharge the battery 20 through regenerative braking. At 412, the disconnect clutch 26 is disengaged, decoupling the engine 14 from the M/G 18. This removes any compression braking in the engine 14 from being realized throughout the remainder of the powertrain 12. With the compression braking being negated, the entire overall coasting torque can be supplied by regenerative braking in the M/G 18, thereby maximizing the amount of electric charging supplied to the battery 20 and more efficiently increasing the SOC of the battery 20. Regenerative braking can supply the necessary negative torque required to fulfill the desired overall coasting torque during steps 406 and 408 with the engine 14 disconnected.

With the disconnect clutch 26 engaged to couple the engine 14 to the M/G 18, if the SOC of the battery 20 is not below the first SOC threshold at 410, it is not necessarily a priority to rapidly recharge the battery 20. As such, the engine 14 can remain coupled to the M/G 18 to supply compression torque during the coasting event. At 414, the controller determined the vehicle speed, and utilizes the lookup table at 416 to determine the desired overall coasting torque. The controller then determines the amount of compression torque provided by the engine 14, and if necessary, supplements the engine compression torque with regenerative braking in the M/G 18 to fulfill the desired overall costing torque. At 418, similar to step 310, the controller commands regenerative braking based on the vehicle speed and the magnitude of engine compression torque. The coasting event, and thus the control strategy, continues until a subsequent depression of the accelerator pedal, brake pedal, or leveling off of the vehicle speed occurs at 420.

Returning back to the situation in which the disconnect clutch 26 disengaged (either as determined at step 404 or commanded at 412) and thus the engine 14 is not providing compression torque, the SOC of the battery 20 is continuously monitored throughout the coasting event at 422. If the SOC of the battery 20 is maintained below a second threshold (thresh_high), the system continues to meet the desired overall coasting torque by commanding regenerative braking in the M/G 18 without any compression braking from the engine 14.

If, however, the SOC of the battery 20 increases above the second threshold (thresh_high) at 422, it is determined that the SOC is too high and additional regenerative braking may be harmful to the battery 20. In response to the SOC being above the second threshold, the disconnect clutch 26 is commanded to re-engage to couple the engine 14 back to the M/G 18 at 424. Fuel may then be added to the engine to "start" the engine, enabling combustion to occur in the engine 14. By actuating the disconnect clutch 26, the engine 14 is enabled to provide compression braking to the powertrain 12 such that the amount of regenerative braking can be reduced, inhibiting an overcharge of the battery 20. With compression braking causing deceleration in the vehicle, the control system alters its commanded regenerative braking such that the amount of engine compression torque is compared with the desired overall coasting torque, with the difference being commanded by the M/G 18. In other words, after the disconnect clutch is engaged at 424, the algorithm proceeds to 416. The amount of regenerative braking is then commanded based on the speed of the vehicle and the amount of engine compression torque at 418.

Rather than engaging the disconnect clutch when the SOC is above the second threshold, it should be understood that the controller can command friction/hydraulic braking in the vehicle to meet the desired overall coasting torque. This may provide a better fuel efficiency in the vehicle as the engine 14 is not needed to be activated to provide compression braking. Friction braking may also be activated at any time during the control strategy in place of regenerative braking in the event the SOC of the battery 20 reaches a charge threshold to prevent overcharging of the battery 20.

One example of the first threshold is 40% of the maximum charge of the battery, and one example of the second threshold is 60% of the maximum charge. This provides an optimum battery operating window of 40%-60%. It should be understood that these thresholds can vary and can be optimally set for any hybrid vehicle.

Instead of (or in combination with) continuously monitoring the SOC during the coasting event and correspondingly re-engaging the disconnect clutch 26 based on the SOC being above the second threshold at 422, the controller can command the disconnect clutch 26 to re-engage based on the rotational speed of the output of the M/G 18. As previously described, the torque converter 22 includes an impeller that is connected to the output of the M/G 18. Rotational speed of the impeller therefore indicates the rotational speed of the output of the M/G 18. In a scenario in which the M/G 18 is rotating at high speeds during the coasting event, it may be undesirable to command regenerative braking without the assist of engine compression due to the maximum limits of the regenerative braking system. The engine 14 can therefore be recoupled to the M/G 18 via the disconnect clutch 26 in response to the rotational speed of the impeller being above a rotational speed threshold (e.g., 2000 RPM) during the coasting event (subsequent to the tip-out of the accelerator pedal 52). This assures compression braking is available, and the amount of regenerative braking can be reduced from what it would otherwise be commanded to provide without the assist of compression braking in order to fulfill the desired overall coasting torque. The controller can command the disconnect clutch 26 to disengage again once the rotational speed falls below the threshold, whereupon the amount of regenerative braking can be commanded to sharply increase due to the absence of engine compression braking.

The embodiments described above explain a system for control of overall coasting torque of a vehicle by commanding various outputs by the M/G 18. References have been made to beginning the control system based upon a tip-out of the accelerator pedal, indicating the beginning of a coasting event. However, it should be understood that release of the brake pedal when the vehicle is stopped can cause the vehicle to creep. Creeping of the vehicle can also be considered a coasting event, and therefore the algorithms described above can similarly be activated based upon a tip-out of the brake pedal.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
   an engine;
   an electric machine selectively coupled to the engine via a clutch;
   an accelerator pedal; and
   at least one controller programmed to disengage the clutch and alter a commanded torque to the electric machine in response to a tip-out of the accelerator pedal to simulate compression braking of the engine.

2. The hybrid vehicle of claim 1, wherein the at least one controller is further programmed to command braking torque in the electric machine in response to the tip-out of the accelerator pedal.

3. The hybrid vehicle of claim 2, wherein a magnitude of the braking torque commanded by the at least one controller varies in response to various tip-outs of the accelerator pedal occurring at correspondingly various vehicle speeds such that the braking torque of the electric machine simulates various magnitudes of engine compression braking at various vehicle speeds.

4. The hybrid vehicle of claim 3, wherein the magnitude of the braking torque commanded by the at least one controller is determined from a look-up table as a function of vehicle speed.

5. The hybrid vehicle of claim 1, further comprising a battery electrically connected to the electric machine for storing electric power generated by the electric machine, wherein the at least one controller is further programmed to re-engage the clutch and activate the engine in response to (i) the accelerator pedal being non-depressed and (ii) a state of charge (SOC) of the battery exceeding a SOC threshold.

6. The hybrid vehicle of claim 5, wherein the at least one controller is further programmed to alter the commanded torque to the electric machine during vehicle coasting based upon (i) vehicle speed and (ii) engine torque.

7. The hybrid vehicle of claim 6, wherein the at least one controller is further programmed to reduce the commanded torque of the electric machine while a braking torque of the engine is maintained in response to a reduction of vehicle speed.

8. The hybrid vehicle of claim 6, wherein the at least one controller is further programmed to increase the commanded braking torque in the electric machine during vehicle coasting based upon a decrease of engine torque.

9. The hybrid vehicle of claim 1, wherein the electric machine includes an output, and wherein the at least one controller is further programmed to re-engage the clutch and activate the engine in response to (i) the accelerator pedal remaining non-depressed and (ii) the output of the electric machine having a rotational speed above a speed threshold.

10. A system for controlling coasting torque in a hybrid vehicle, comprising:
    an engine;
    an electric machine selectively coupled to the engine via a clutch;
    a battery electrically connected to the electric machine;
    an accelerator pedal; and
    at least one controller programmed to engage the clutch during an electric-only mode of operation in response to (i) a tip-out of the accelerator pedal and (ii) a state-of-charge of the battery exceeding a charge threshold.

11. The system of claim 10, wherein the at least one controller is further programmed to reduce a braking torque of the electric machine in response to the engagement of the clutch.

12. The system of claim 11, wherein the at least one controller is further programmed to alter a rate of decrease of braking torque of the electric machine while a braking torque of the engine is maintained in response to a reduction of vehicle speed.

13. The system of claim 11, wherein the at least one controller is further programmed to increase the braking torque in the electric machine during vehicle coasting based upon a decrease of engine torque.

14. The system of claim 11, wherein the at least one controller is further programmed to alter a rate of decrease of the braking torque in the electric machine during vehicle coasting based upon an increase of engine torque.

15. A system for controlling coasting torque in a hybrid vehicle, comprising:
    an engine;
    an electric machine having an output and selectively coupled to the engine via a clutch;
    an accelerator pedal; and at least one controller programmed to engage the clutch during an electric-only mode of operation in response to (i) a tip-out of the accelerator pedal and (ii) a rotational speed of the output of the electric machine being above a speed threshold.

16. The system of claim 15, wherein the at least one controller is further programmed to decrease a braking torque of the electric machine in response to the engagement of the clutch.

17. The system of claim 15, further comprising a brake pedal, wherein a coasting event is defined during a time in which the accelerator pedal and the brake pedal are non-depressed.

18. The system of claim 17, further comprising a battery electrically connected to the electric machine for storing electric power generated therefrom, wherein the at least one controller is further programmed to engage the clutch during the coasting event in response to a state of charge of the battery being above a threshold.

19. The system of claim 15, further comprising a torque converter having an impeller coupled to the electric machine, wherein the output of the electric machine is the impeller such that the at least one controller is programmed to engage the clutch in response to a rotational speed of the impeller being above the speed threshold.

20. The system of claim 15, further comprising a battery electrically connected to the electric machine, wherein a coasting event of the vehicle begins in response to the tip-out of the accelerator pedal, and wherein the at least one controller is further programmed to disengage the clutch to mechanically isolate the engine from the electric machine during the coasting event in response to a state of charge of the battery being below a threshold.

21. The system of claim 15, wherein the at least one controller is further configured to, subsequent to engaging the clutch, disengage the clutch in response to a rotational speed of the output of the electric machine being below the speed threshold.

* * * * *